Sept. 20, 1971 L. E. BOWMAN 3,605,784
MIXING VALVE
Filed Dec. 23, 1969 3 Sheets-Sheet 3

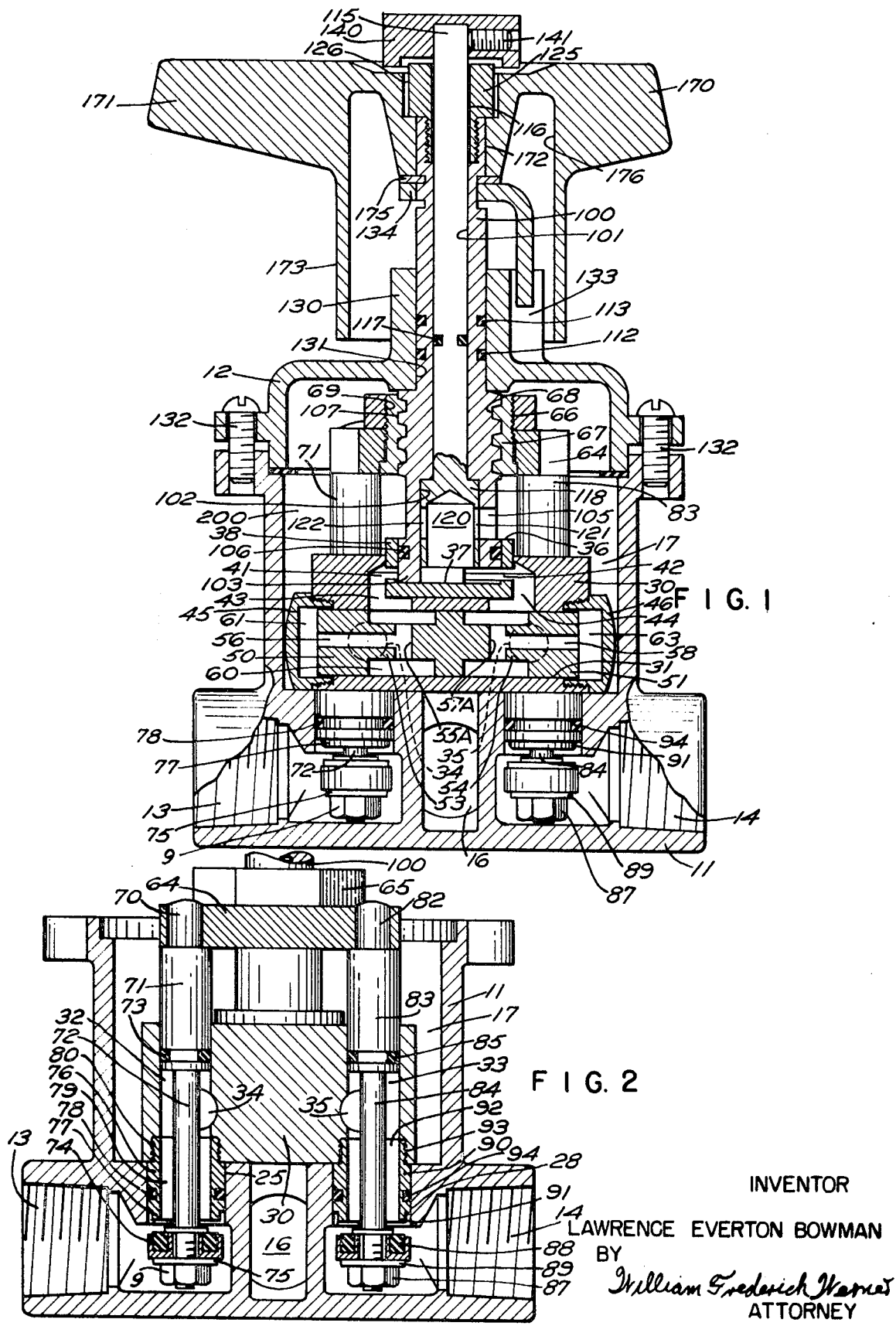

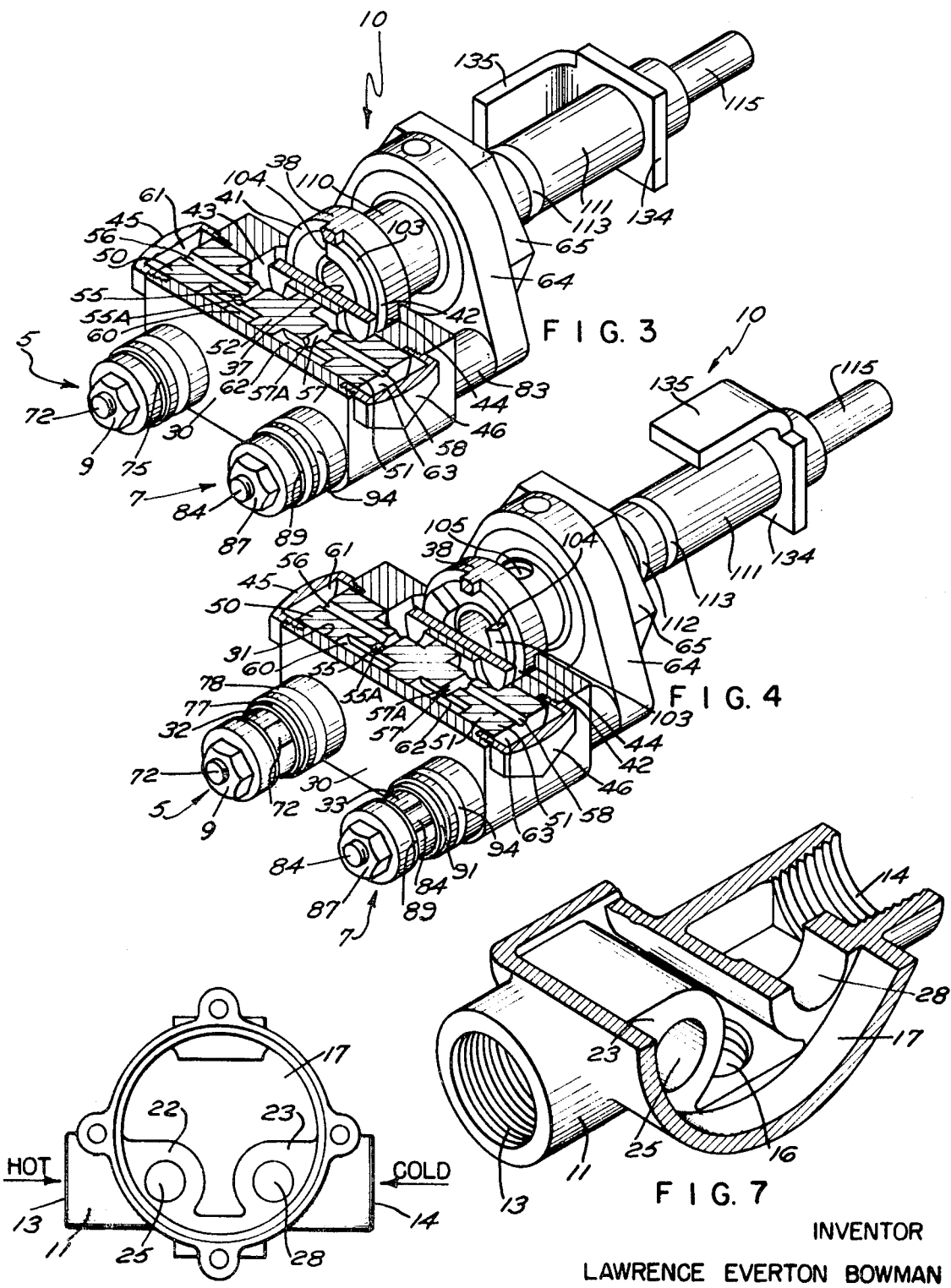

INVENTOR
LAWRENCE EVERTON BOWMAN
BY
William Frederick Werner
ATTORNEY

United States Patent Office 3,605,784
Patented Sept. 20, 1971

3,605,784
MIXING VALVE
Lawrence Everton Bowman, Warwick, R.I., assignor to
Leonard Valve Company, Cranston, R.I.
Filed Dec. 23, 1969, Ser. No. 887,550
Int. Cl. G05d 11/00
U.S. Cl. 137—100                                  3 Claims

ABSTRACT OF THE DISCLOSURE

This invention relates to a bathroom shower hot and cold water mixing valve which incorporates three structural features. One feature is an independently operated volume or flow control valve for the mixed water. The second feature is a valve opening and valve closing independently operated temperature regulating sleeve. The third feature is an equalizing valve for maintaining the mixed water in the mixing chamber at the pre-selected temperature determined by the temperature regulating sleeve regardless of the variation in pressure of the respective, hot and/or cold water supply.

---

The present invention relates to mixing valves for fluids under the same or relatively different pressures and/or temperatures and more particularly to an improved mechanism for automatically regulating the temperature of the mixed fluid by means of an equalizing valve and the preselected temperature of the fluid in the mixing chamber by means of a valve supply opening and supply closing temperature regulating sleeve with an independently operated volume control valve for the mixed fluid.

An object of the present invention is to provide a mixing valve which may be set to deliver water at a predetermined temperature and which contains an equalizing valve operable to maintain the delivery of water at the selected temperature irrespective of variations in the supply pressures of the hot and cold water.

Another object of the present invention is to provide a mixing valve for hot and cold water under pressure, such as are utilized in connection with shower baths, and which is so constructed that cold water will always flow through the valve first and thereby prevent hot water from scalding a bather.

Still another object of the present invention is to provide a mixing valve with a construction which provides extreme accuracy in maintaining the selected temperature of the mixed fluids and with ready and easy access to the equalizing valve and to the temperature regulating sleeve for servicing, especially cleaning the respective parts of accumulated dirt, sand, grit, and deposits normally found in valves used in water lines.

And still another object of the present invention is to provide a shower mixing valve for hot and cold water under pressure, with a temperature regulating sleeve for controlling the temperature of the mixed water and with a volume control valve stem for controlling the volume or rate of flow of the mixed water and with an equalizing valve accurately controlling the mixed water temperature.

Other objects of the present invention will become apparent in part and be pointed out in part in the following specification and claims.

Referring to the drawings in which similar characters of reference refer to like parts:

FIG. 1 is a vertical sectional view taken upon the medial line of the new and improved mixing valve.

FIG. 2 is a fragmentary cross sectional view similar to FIG. 1, showing the hot and cold water supply valves in open position.

FIG. 3 is a perspective view, partly in section, showing the hot and cold water supply valves in closed position, the temperature regulating sleeve and the volume control valve.

FIG. 4 is a view similar to FIG. 3, showing the hot and cold water supply valves in open position.

FIG. 6 is a plan view of the body of the mixing valve housing.

FIG. 7 is a fragmentary perspective view, partly in section, showing the hot water supply inlet, cold water supply inlet, mixed water chamber and mixed water outlet, located in the body of the mixing valve housing.

Figure 5:
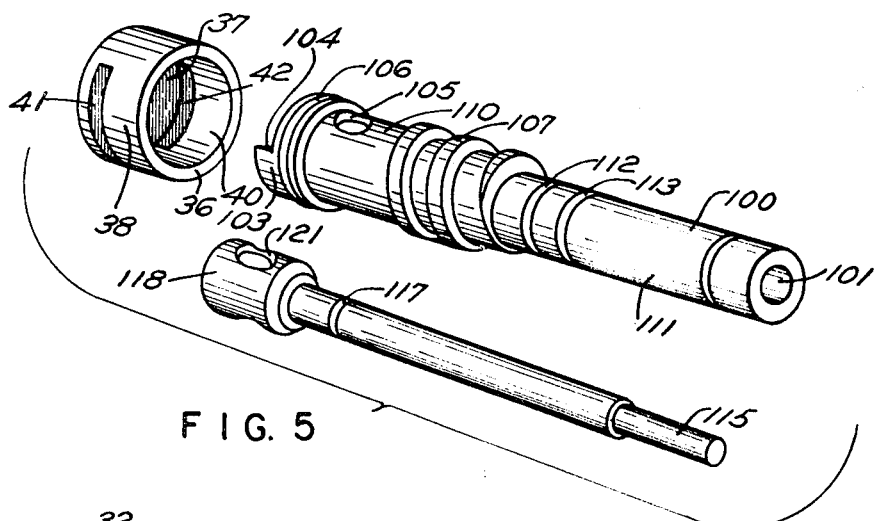
FIG. 5 is an exploded perspective view of the bushing, volume control valve stem and temperature regulating sleeve.
Figure 8:
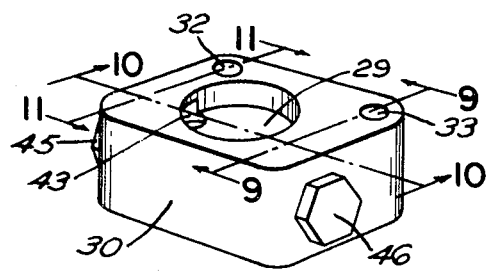
FIG. 8 is a perspective view of the valve block.
Figure 9:
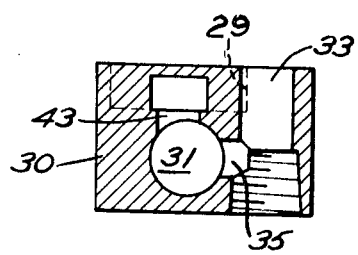
FIG. 9 is a vertical cross sectional view taken on line 9—9 of FIG. 8.
Figure 10:
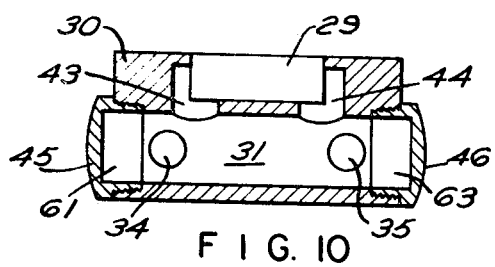
FIG. 10 is a vertical cross sectional view taken on line 10—10 of FIG. 8.
Figure 11:
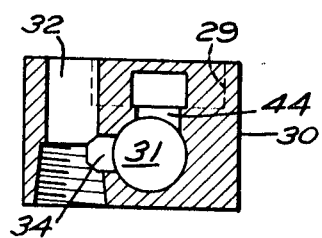
FIG. 11 is a vertical cross sectional view taken on line 11—11 of FIG. 8.

In proceeding with this invention, there is illustrated in FIGS. 1, 2, 6 and 7 a mixing valve housing consisting of a body section 11 and a cap 12.

The body section 11 may be in the form of a cored casting, having a hot water inlet 13, and a cold water inlet 14, which may be threaded so as to be connected, respectively to pipes (not shown) supplying, respectively, hot fluids and cold fluids, and an outlet 16 adapted to be connected to a suitable delivery pipe (not shown) for the mixed fluids.

The body section 11 is provided with a chamber 17 having the outlet 16 which may be provided with screw threads, and two flanged seats 22, 23. Hot water inlet 13 connects to a port 25 in seat 22. Cold water inlet 14 connects to a port 28 in seat 23.

The three features of the present mixing valve are contained in a unit structure, generally indicated by reference numeral 10 in FIGS. 3 and 4 and shown assembled in the mixing valve housing in FIG. 1.

A valve block 30 is provided with a cavity 29, a valve sleeve 31, a hot water passageway 32, a cold water passageway 33, a hot water conduit 34 connecting hot water passageway 32 with valve sleeve 31 and a cold water conduit 35 connecting cold water passageway 33 with valve sleeve 31.

Figure 12:
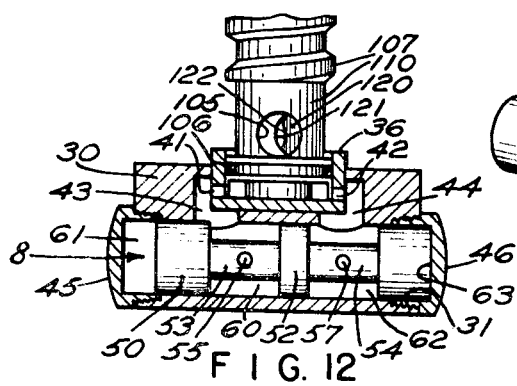
FIG. 12 is a fragmentary cross sectional view showing the valve block, bushing, temperature regulating sleeve, volume control valve stem, and equalizing valve.
Figure 13:
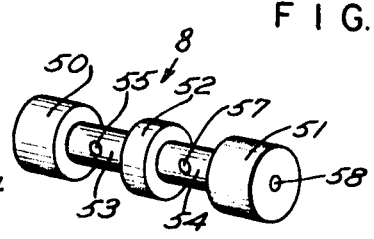
FIG. 13 is a perspective view of the equalizing valve.

A bushing 36 having a seat 37, vertical sides 38 which form an annular recess 40 and hot water exit 41 and cold water exit 42 located in said vertical sides is fastened in cavity 29 of valve block 30 by means of a drive fit. A hot water orifice 43 (see FIG. 12) connects valve sleeve 31 with hot water exit 41. A cold water orifice 44 connects valve sleeve 31 and cold water exit 42. Caps 45 and 46 are fastened in valve block 30 at opposite ends of valve sleeve 31.

An equalizing valve or piston identified in its entirety by the reference character 8 (see FIGS. 1, 3, 4, 12 and 13) provided with a hot water valve head 50, a cold water valve head 51 and a blocking head 52 is slidably mounted in valve sleeve 31. A hot water reduced area 53 lies between blocking head 52 and hot water valve head 50. Similarly, a cold water reduced area 54 lies between blocking head 52 and cold water valve head 51. A hot water port 55 is provided in hot water reduced area 53. A hot water bore 56 extends from one end of the piston to port 55 which has a pressure wall 55A. Similarly, a cold water port 57 is provided in cold water reduced area 54. A cold water bore 58 extends from the other end of the piston to port 57 which has a pressure wall 57A.

Equalizing valve or piston slidably mounted in valve sleeve 31 divides the sleeve area into four sections, namely, hot fluid section 60, hot water pressure section 61, cold fluid section 62, and a cold water pressure section 63.

A triangularly shaped yoke 64 is provided with a hexangular shaped portion 65 and an axial orifice 66. A bushing 67 provided axially with long lead threads 68 is fastened in axial orifice 66 by means of screw threads 69.

A hot water valve, generally indicated at 5 is provided with a stem 70 (see FIG. 2) having a head 71 and a body portion 72 is provided with an O ring 73 in head 71. One end of hot water valve stem 70 is fastened in yoke 64, as by means of a force fit, with head 71 slidably mounted in hot water passageway 32. Body portion 72 is reduced in size to permit the flow of hot water through hot water passageway 32.

The other end of hot water valve stem 70 is threaded to receive a nut 9 which fastens a cup having a fluid tight packing 74, backed up by a washer 75, to the end thereof. A bushing 76 provided with a valve seat 77, and O ring 78 and a hot water passage 79 is fastened to valve block 30 by means of threads 80 with hot water passage 79 aligned with hot water passageway 32 as a part thereof.

Similarly, a cold water valve, generally indicated at 7, is provided with a stem 82, having a head 83 and a body portion 84 is provided with an O ring 85 in head 83. One end of cold water valve stem 82 is fastened in yoke 64, as by means of a force fit, with head 83 slidably mounted in cold water passageway 33. Body portion 84 is reduced in size to permit the flow of cold water through cold water passageway 33.

The other end of cold water valve stem 82 is threaded to receive a nut 87 which fastens a cup having a fluid tight packing 88, backed up by a washer 89, to the end thereof. A bushing 90 provided with a valve seat 91, an O ring 94 and a cold water passage 92 is fastened to valve block 30 by means of threads 93 with cold water passage 92 aligned with cold water passageway 33 as a part thereof.

A temperature regulating sleeve 100 is provided with an axial bore 101 adjacent a cavity 102. Externally, sleeve 100 is provided with an enlarged portion 110 and a shank portion 111. A semi-circular step is provided in the end of enlarged portion 110 to provide a fluid sealing face 103 and a fluid flow duct 104. Enlarged portion 110 is also provided with a long lead thread 107, an O ring 106 and a flow port 105 located in the wall of the enlarged portion 110 venting cavity 102. Two O rings 112, 113 are located on shank portion 111.

A volume control valve stem 115 is provided with a shank 116 having an O ring 117 and a head 118 integrally connected therewith and provided with a fluid mixing chamber 120. Two mixed fluid ports 121 and 122 are located in the wall of head 118.

Volume control valve stem 115 is rotatively mounted within temperature regulating sleeve 100 with shank 116 located within axial bore 101 and head 118 located within cavity 102. Alternately, mixed fluid ports 121 and 122 align with flow port 105. A threaded fitting 125 provided with an enlarged head 126 is fastened in axial bore 101 to threads provided therein for that purpose. O ring 117 forms a fluid seal with the wall of axial bore 101. Long lead thread 107 rotatively engages long lead thread 68 so that fluid sealing face 103 may rotatively engage and disengage hot water exit 41 and cold water exit 42. A knob 140 is fastened to the end of volume control valves stem 115 by means of a set screw 141.

Cap 12 is provided with a neck 130 having a bearing 131. Shank portion 111 rotatively engages bearing 131 with O rings 112 and 113 providing a fluid tight seal. Screws 132 fasten cap 12 to body section 11. Shank portion 111 is provided with a rotational stop element 133. A bracket having a collar 134 integrally connected with a stopping leg 135 is fastened to shank portion 111, in a manner, to limit rotation of temperature regulating sleeve 100 to less than one full revolution.

A temperature control indicator 170 in the form of a cover is provided with a finger indicator 171, a bearing surface 172 which engages shank portion 111 with a force fit, a depending portion 173 which forms a hollow interior 175. A washer 176 is interposed between the end of bearing surface 172 and collar 134.

FIGS. 3, 4, 6 and 1, in that order, make it apparent that the new and improved mixing valve comprises four units or subassemblies.

The working elements are assembled in one unit which can be shipped anywhere without the need of a mechanic or person of skill to assemble the mixing valve. See FIGS. 3 and 4.

Body section 11 is normally fastened into a bathroom wall. FIG. 6.

Valve block 30 housing the equalizing valve, with the hot water valve 5 and cold water valve 7 fastened to yoke 64 slidably mounted therein; and with volume control valve stem 115 rotatively mounted within temperature regulating sleeve 100; which in turn is rotatively connected to yoke 64; constitutes the working part assembly.

Bushings 76 and 90 are fastened in ports 25 and 28, respectively, with valve block 30 engaging seats 22 and 23.

Cap 12 fastens valve block 30 assembly within body section 11 through temperature regulating sleeve 100.

Temperature control indicator 170 and knob 140 are then added to complete the unit structure.

In operation, hot water valve 5 and cold water valve 7 are normally closed. In this position sealing face 103 blocks both hot water exit 41 and cold water exit 42. Temperature control indicator 170, with finger indicator 171 indicating "OFF" position, will be rotated until finger indicator 171 is placed in selected water temperature position. Rotation of temperature control indicator 170 rotates temperature regulator sleeve 100, thereby, actuating three valves simultaneously. Sealing face 103 is rotated out of position away from cold water exit 42. Sealing face 103 will rotate to fully expose cold water exit 42 before sealing face 103 disengages hot water exit 41. Sealing face 103 is of a dimensional quadrant to cause sealing face 103 to start to block cold water exit 42 on one end as the other end starts to unblock hot water exit 41. In this manner, cold water always pours forth from outlet 16, first.

Simultaneously, with the rotation of temperature regulator sleeve 100 both hot water valve and cold water valve move to valve open position a distance dictated by the rotation of long lead threads 107.

Cold water therefore flows from cold water inlet 14, to port 28, past fluid tight packing 88, into cold water passageway 33, through cold water port 35, into cold fluid section 63, and through cold water exit 42 into fluid mixing chamber 120. In like manner, hot water will flow into fluid mixing chamber 120. Water of selected temperature will flow through either mixed fluid port 121 or 122 depending which of these ports is aligned with flow port 105. Independent rotation of volume control valve stem 115 will partially or wholly align one of the flow ports 121 or 122 with flow port 105. When partially or wholly aligned with flow port 105 the mixed fluid will flow through either flow port 121 or 122 and flow port 105 into chamber 120 and chamber 17 forming a part of chamber 120 and through outlet 16.

Having shown and described a preferred embodiment of the present invention by way of example, it should be realized that structural changes could be made and other examples given without departing from either the spirit or scope of this invention.

What I claim is:

1. A mixing valve for fluids under pressure comprising a valve body having two inlets for pressurized fluids, one hot and one cold, a mixed fluid chamber provided with a common outlet for said fluids and formed with a fluid pressure equalizing valve sleeve and an annular recess, a valve controlling flow of hot fluid from the inlet provided therefor to said equalizing valve sleeve and a second valve controlling the flow of cold fluid from the inlet provided therefor to said equalizing valve sleeve, a volume control valve stem having a mixing chamber and a flow port, a temperature regulator sleeve, means rotatively mounting said volume control valve stem within said temperature regulator sleeve for manual control of volume passing from said mixing chamber to said mixed fluid chamber, through said flow port, said temperature regulator sleeve being manually movable within said annular recess between a closed position preventing communication of said inlets with said annular recess, and an open position communicating said inlets with said pressure equalizing valve sleeve and mixing chamber, a pressure equalizing valve located in said equalizing valve sleeve controlling communication of said inlets with said annular recess when said temperature regulator sleeve is in open position, said pressure equalizing valve being freely movable in said pressure equalizing valve sleeve under the influence of an imbalance of the pressures of the fluids in the inlets, thereby, to vary the volume of fluid admitted from each inlet to the mixing chamber in inverse proportion to the excess pressure thereof relative to the fluid in the other of said inlets.

2. A mixing valve for fluids under pressure comprising a body section having a first flanged seat, a second flanged seat and a mixed fluid chamber, a hot water port inlet located in said first flanged seat, a cold water port inlet located in said second flanged seat, a valve block, provided with a pressure equalizing valve sleeve and a bushing providing an annular recess having a hot water exit and a cold water exit, said block carrying bushings engageable with said first flanged seat and said second flanged seat, said block having a hot water passageway in communication with said hot water port inlet and said annular recess through said equalizing valve sleeve, and a cold water passageway in communication with said cold water port inlet and said annular recess through said equalizing valve sleeve, a yoke provided with a hot water inlet valve located in said hot water port inlet, a cold water inlet valve located in said cold water port inlet and an axial bore, a volume control valve stem having a mixing chamber and a mixed fluid port, a temperature regulator sleeve, having an enlarged head provided with a cavity, a flow port, and having a sealing face in one end, said volume control valve stem being rotatively mounted within said temperature regulator sleeve for independent rotation therein, with said mixing chamber located in said cavity and with said flow port alignable with said mixed fluid port, said sealing face located within said annular recess and said temperature regulator sleeve located within said axial bore, means in said bore for rotating said sealing face upon rotation of said temperature regulator sleeve to block and unblock said hot water exit and said cold water exit in selected amounts to control the volume of hot water and the volume of cold water entering said mixing chamber, from said hot water passageway and cold water passageway while simultaneously opening said hot water inlet valve and cold water inlet valve, a pressure equalizing valve located in said equalizing valve sleeve controlling communication of said hot water port inlet and cold water port inlet with said annular recess, said pressure equalizing valve being freely movable in said pressure equalizing valve sleeve under the influence of an imbalance of the pressures of the fluids in the hot water passageway and cold water passageway, thereby to vary the volume of fluid admitted from the hot water passageway and cold water passageway to the mixing chamber in inverse proportion to the excess pressure thereof relative to the fluid in the other passageway.

3. A mixing valve comprising a body section having a hot water inlet, a cold water inlet, a chamber having a mixed fluid outlet, and two flanged seats, one flanged seat having a hot water port in communication with said hot water inlet, the other flanged seat having a cold water port in communication with said cold water inlet, a valve block provided with a valve sleeve, a hot water passageway connected to said hot water port, a cold water passageway connected to said cold water port, a hot water conduit connecting said hot water passageway with said valve sleeve and a cold water conduit connecting said cold water passageway with said valve sleeve, a bushing having a seat and vertical sides forming an annular recess, a hot water exit and a cold water exit located in said vertical sides, means fastening said bushing in said valve block, said valve block having a hot water orifice connecting said valve sleeve with said hot water exit and a cold water orifice connecting said valve sleeve with said cold water exit, an equalizing valve provided with a hot water valve head, a cold water valve head and a blocking head, a hot water reduced area between said blocking head and hot water valve head, a cold water reduced area between said blocking head and cold water valve head, a hot water port located in said hot water reduced area, a hot water bore extending from one end of said equalizing valve to said hot water port, a cold water port located in said cold water reduced area, a cold water bore extending from one end of said equalizing valve to said cold water port, said equalizing valve slidably mounted in said valve sleeve and dividing said valve sleeve into a hot fluid section, a hot water pressure section, a cold fluid section and a cold water pressure section, a yoke having an axial orifice, a bushing having a long lead thread fastened in said axial orifice, a hot water valve stem having a head and body portion, means fastening said head to said yoke with said head slidably mounted in said hot water passageway in fluid tight relationship, a fluid tight packing, means fastening said fluid tight packing to said body portion, a bushing having a valve seat fastened to said valve block and located in said hot water passageway, a cold water valve stem having a head and body portion, means fastening said head on said cold water valve stem to said yoke with said head slidably mounted in said cold water passageway in fluid tight relationship, a fluid tight packing fastened to said body portion, a bushing having a valve seat fastened to said valve block and located in said cold water passageway, a temperature regulating sleeve having an enlarged portion and a shank portion, an axial bore terminating in a cavity located in said enlarged portion, and a flow port in said enlarged portion, a semi-circular step provided in the end of said enlarged portion forming a sealing face and a fluid flow duct, a long lead thread provided in said enlarged portion and rotatively connected to said first mentioned long lead thread, the end of said enlarged portion engaging said seat in said first mentioned bushing, said sealing face blocking and unblocking said hot water exit and said cold water exit, a volume control valve stem provided with a shank and head, a fluid mixing chamber in said head on said volume control valve, a mixed fluid port in said head connected to said fluid mixing chamber, said volume control valve stem rotatively mounted within said temperature regulating sleeve with said shank located within said axial bore and said head on said volume control valve located within said cavity whereby rotation of said volume control stem aligns said mixed fluid port with said flow port, a cap provided with a neck having a bearing, said shank rotatively mounted in said bearing, means fastening said cap to said body section to cover said first mentioned chamber, said flow port communicating with said fluid mixing chamber.

References Cited

UNITED STATES PATENTS

| | | | |
|---|---|---|---|
| 942,405 | 12/1909 | McNeil | 137—111 |
| 3,448,755 | 6/1969 | Symmons | 137—100 |
| 3,456,670 | 7/1969 | Bowman | 137—100 |
| 3,469,595 | 9/1969 | Petursson | 137—100 |

LAVERNE D. GEIGER, Primary Examiner

D. J. ZOBKIW, Assistant Examiner

U.S. Cl. X.R.

137—111, 637.4